June 16, 1953          G. B. COCHRAN          2,642,120
ADJUSTABLE AUTOMOBILE SEAT Filed Nov. 3, 1948          8 Sheets-Sheet 1

Inventor
GEORGE B. COCHRAN

By Irving A. McCathran

HIS ATTY.

June 16, 1953  G. B. COCHRAN  2,642,120
ADJUSTABLE AUTOMOBILE SEAT
Filed Nov. 3, 1948  8 Sheets-Sheet 4

Fig. 6.

Inventor
GEORGE B. COCHRAN

By Irving R. McCathran
HIS ATTY.

Patented June 16, 1953

2,642,120

UNITED STATES PATENT OFFICE 2,642,120

ADJUSTABLE AUTOMOBILE SEAT

George B. Cochran, Sutherland, Nebr.

Application November 3, 1948, Serial No. 58,125

5 Claims. (Cl. 155—7)

This invention relates to automobile car seats, and has for one of its objects the production of a simple and efficient means for converting automobile seats into a full size bed for sleeping purposes.

A further object of this invention is the production of a simple and efficient means for facilitating the adjustment of an automobile seat to change the seat from a driving position to an inclined or reclining position to a bed or sleeping position.

Other objects and advantages of the present invention will appear throughout the following specification and claims.

In the drawings:

Figure 4 is a top plan view of the seat adjusting mechanism, certain parts being shown in section;

Figure 4ª is a detail longitudinal sectional view of the rack bar engaging tubular member, and a portion of the rack bar which is mounted therein;

Figure 18 is a top plan view of the structure shown in Figure 17 certain parts being shown in section;

Figure 18ª is an enlarged side elevational view of the clamp shown in Figure 18, a portion thereof being shown in section;

Figure 1:
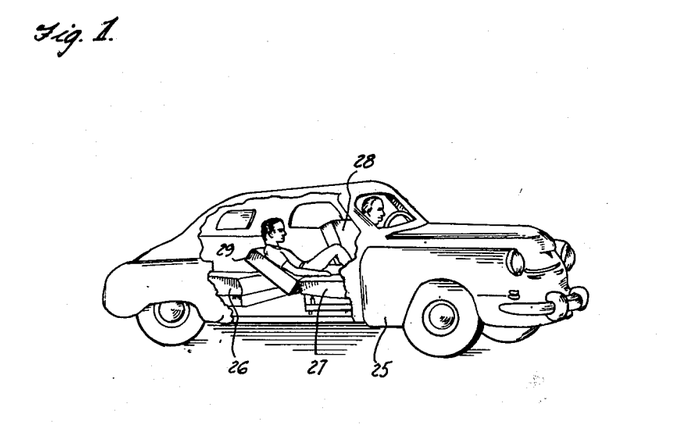
Figure 1 is a perspective view of an automobile partly broken away and showing the back of one of the front seats in a reclining position.
Figure 2:
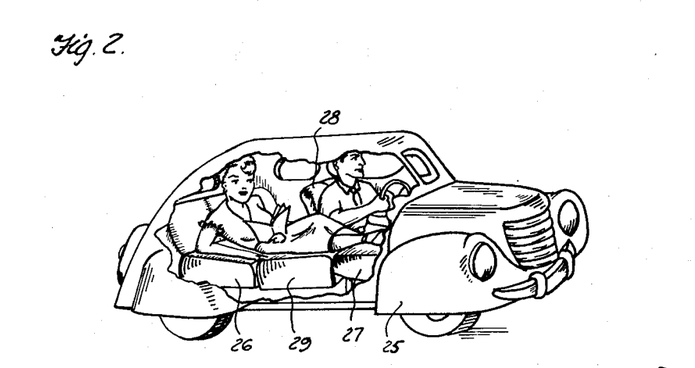
Figure 2 is a perspective view of an automobile partly broken away and showing the back of one of the front seats in a bed or sleeping position.

By referring to the drawings, it will be seen that 25 designates a conventional automobile which is provided with a rear seat 26 and a pair of front seats, each front seat having a conventional seat cushion or section such as the cushion or section 27 illustrated. The driver's seat is provided with a back rest or section 28 and the adjoining front seat is provided with a back rest or section 29. The back rest or section 28 as well as the back rest or section 29 preferably is adjustable from an upright to a reclining or to a bed or sleeping position. If desired, the back rest 29 may be moved to a reclining position as shown in Figure 1, while the back rest 28 of the driver's seat may remain in an upright position so that one person may drive while the other person may relax in a reclining or rearwardly inclined position. If desired, the back rest 29 may be adjusted to a substantially horizontal bed position for sleeping or resting accommodations. If desired, both of the back rests 28 and 29 may be rearwardly inclined or moved to a horizontal bed position to convert the interior of the automobile 25 into lounging or sleeping accommodations within the spirit of the invention.

For the purpose of illustration, the seat adjusting mechanism is shown as actuating one front seat cushion 27 and one back rest 29 and it should be understood that the adjoining front seat and back rest 28 are similarly supported and actuated by a duplicate mechanism so that each front seat may be individually adjusted to suit the occupants of the automobile. It will be noted that the front seat cushion 27 is supported upon a seat frame 30 which is in turn supported by the conventional support now commonly used for supporting the front seat or seats of an automobile and this frame 30 is merely anchored upon the top of such a conventional support in any desired manner which may be common to the trade. Suitable slotted angle brackets 31 are carried by the seat frame 30 for anchoring the front portion of the cushion 27 in place upon the frame and to act as fulcrum abutments therefor when the cushion 27 is raised and lowered. An angle plate 32 preferably extends across the under and rear face of the cushion 27 for reinforcing the same and for constituting an abutment for the elevating arms 33 when raising and lowering the front seat cushion from a seat to a bed position, as will be more fully described in the following specification.

Figures 4, 4A:
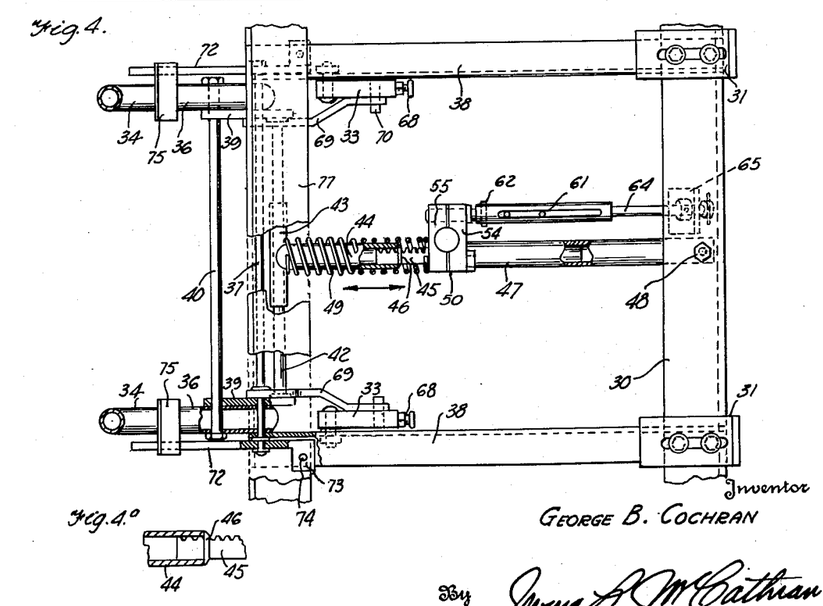
Figure 5:
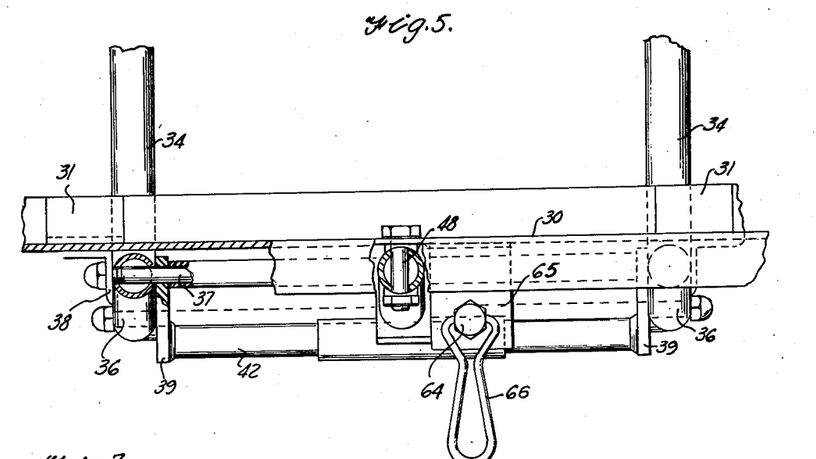
Figure 5 is a front elevational view of the rear adjusting mechanism, certain parts being shown in section.
Figures 7, 8, 9:
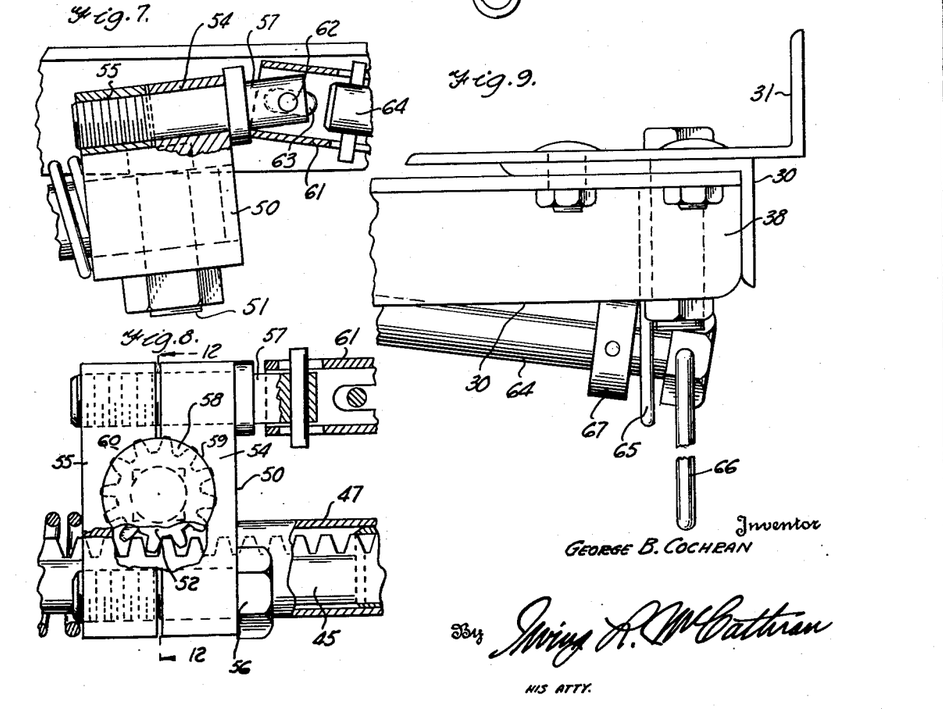
Figure 7 is an enlarged side elevational view of the clamp for locking the seat in a set position, a portion of the actuating sleeve being shown in section.
Figure 8 is an enlarged top plan view of the clamp.
Figure 9 is an enlarged side elevational view of the front end of the front seat frame, illustrating the forward end of the actuating sleeve.
Figure 10:
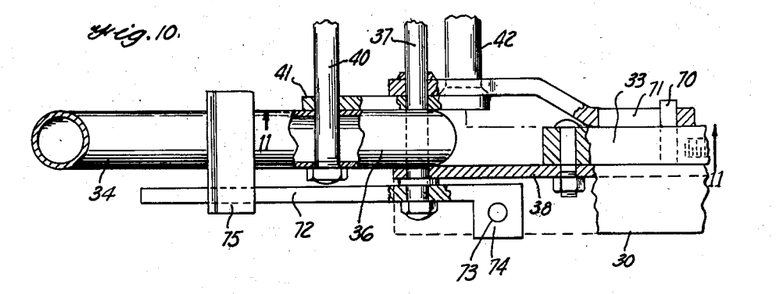
Figure 10 is an enlarged top plan view partly in section showing one of the seat back supporting rods and the means for attaching the same to its supporting means.

The back rest 29 or seat back is supported by means of the bars 34 which are slidably connected to the back rest 29, as at 35, in any suitable manner, at their outer ends, each bar 34 being provided with a forwardly curved inner end 36. The inner curved end 36 of the each bar 34 is journalled upon the anchoring shaft 37 which shaft 37 is secured at its opposite end to the parallel side angle plates 38 of the seat frame 30, as shown in Figure 4. A crank plate 39 is secured to the anchoring shaft 37 in abutting relation to the inner face of the inner end 36 of each bar 34. A tie rod 40 is connected at its opposite ends to the opposite bars 34 and these opposite ends of the rod 40 pass through the rear ends 41 of the crank plates 39, as shown in Figures 4, 9 and 10. The forward ends of the opposite crank plates or rocker plates 39 are connected by means of a transverse tubular bar 42 which is secured to the plates 39 in any desired manner. The two rocker or crank plates 39, together with the rod 40 and the bar 42 constitute a rocker frame to facilitate the swinging of the bars 34 upon the anchoring shaft 37.

A rotating sleeve 43 is preferably carried intermediate the ends of the tubular bar 42, as shown in Figure 4, to which sleeve 43 is secured a forwardly extending tubular member 44. This tubular member 44 slidably receives one end of the adjusting rack bar 45. A stop collar 46 is carried by the rack bar 45 to abut against the outer end of the tubular member 44, as shown in detail in Figure 4ᵃ, to permit the tubular member 44 to slide in one direction relative to the rack bar, such for instance when the seat back 29 is swung forwardly from its upright position when a passenger enters the automobile between the front and rear seats. The rack bar 45 extends through the gear clamp 50 and into the clamp supporting tubular member 47 which is anchored to the front face of the gear clamp 50. The forward end of the tubular member 47 is anchored to the front end of the frame 30 by means of a suitable anchoring bolt 48. A coil spring 49 is carried by the member 47 and is interposed between and fixed to the clamp 50 and the sleeve 43, to return the rocker frame to its initial position before the forward tilting of the back rest 29 took place, and consequently return or swing the back rest to its upright or driving position.

The gear clamp 50 comprises a casing carrying an upwardly extending shaft 51 upon which is keyed or otherwise fixed a gear 52. The gear 52 is carried within the compartment 53 of the casing of the clamp 50. The rack bar 45 extends through the compartment 53 and meshes with the gear 52. The casing of the clamp 50 may be closed in any desired manner, such for instance by a removable plate 50ᵃ to permit access to the gear 52 while assembling or replacing parts thereof. Clamping jaws 54 and 55 are carried by the clamp 50, the jaw 54 being stationary and the jaw 55 being secured to the jaw 54 by means of a threaded bolt 56 at one end and an adjusting threaded member 57 at the other end. The shaft 51 is provided with a knurled upper head 58 which fits in the semi-circular recesses 59 and 60 of the abutting jaws 54 and 55 which are arranged in opposed relation. As the adjusting member 57 is threaded into the jaw 55, the knurled head 58 will be firmly gripped within the recesses 59 and 60 of the jaws 54 and 55, thereby locking the shaft 51 against rotation and locking the rack bar 45 in a set position. The forward end of the rack bar extends into the member 47 which acts as a guide therefor.

An actuating sleeve 61 is connected to the adjusting member 57 by means of a pin 62 which is carried by the adjusting member 57 and a slot 63 of the actuating sleeve 61. This sleeve 61 is slidably connected to an actuating rod 64 which is connected to the sleeve by means of a pin and slot arrangement shown. The forward end of the actuating rod 64 is journalled upon a depending hanger 65 which is carried by the frame 30 and a pivoted link 66 normally depends from the forward end of the rod 64 to facilitate the rotation of the rod 64, sleeve 61 and adjusting member 57. A collar 67 holds the rod 64 against longitudinal shifting movement in one direction relative to the hanger 65.

Figure 3:
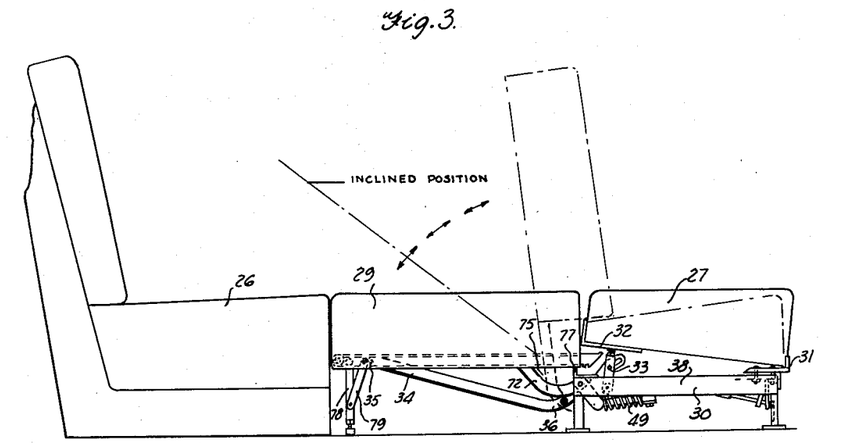
Figure 3 is a side elevational view of the seats of an automobile showing the back of the front seat in a bed or sleeping position and indicating other positions in dotted lines.

A front seat elevating arm 33 above mentioned is pivotally secured to the frame 30 upon each side near the rear end thereof. Each arm 33 is provided with an adjustable end 68 to facilitate the proper lengthening or shortening of the arm 33 to raise the front seat to a proper level when the front seat is being used as part of a bed assembly such as is shown in Figure 3. Each arm 33 is pivotally connected to the frame and is raised and lowered by means of the crank lever 69 which is secured to the shaft 37 and is connected to the arm 33 by means of a pin 70. The pin 70 passes through a longitudinal slot 71 formed in the end of the crank lever 69 to cause the arm 33 to swing to a vertical from a substantially horizontal position as the crank plates 39 of the rocking frame are swung to move the back rest 29 from an upright to a horizontal or bed position shown in Figures 3 and 6.

Figure 6:
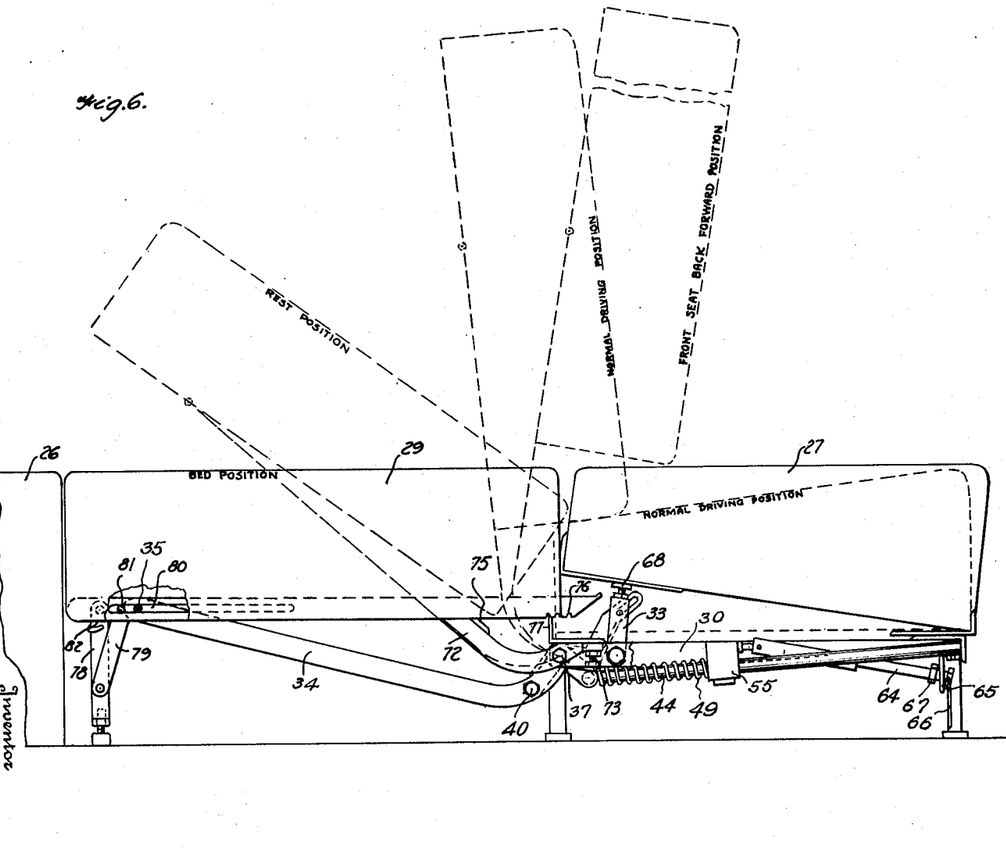
Figure 6 is an enlarged side elevational view of the seats in a bed position.

A back rest support 72 is pivotally supported upon each end of the shaft 37 and each support is provided with a lateral flange 73, carrying an adjustable bolt 74 to abut the bottom of the seat frame 30, as shown in Figure 6, and limiting the swing of the back rest support 72 in one direction. The outer end of each support 72 is provided with a transverse rest plate 75 to contact the under face of the back rest 29 when the back rest is in a horizontal position as shown in Figures 3 and 6, to support the front portion of the back rest 29. The back rest 29 preferably is provided with a forwardly projecting rack 76 for engagement with the top edge of the rear angle plate 77 to hold the back rest 29 against forward shifting movement when this back rest is in a horizontal position.

The rear adjustable supporting leg 78 is pivotally secured to the rear of the back rest 29 preferably one on each side, and an actuating link 79 is connected to the leg 78, as shown in Figure 6. The link 79 slidably engages the slot 80 in the frame of the back rest 29 and a pin 81 carried by the link 79 abuts the end adjacent the back rest supporting bar 34 to swing the leg 78 from a folded position or from a horizontal position to an upright supporting position shown in Figure 6. A spring 82 is preferably carried by the leg 78 to automatically swing the leg 78 to a horizontal or inactive position when the bar 34 recedes longitudinally of the slot 80 and the back rest 29 swings from a horizontal to an upright or inclined position.

The operation of the present invention is as follows:

When it is desired to move the back rest of the front seat from an upright position to a rearwardly inclined position, the operator grips the link 66 with one hand and rotates the actuating rod 64 in the desired direction counterclockwise which in turn loosens the threaded adjusting member 57 and releases the gripping jaws 54 and 55 from gripping engagement with the knurled head 58 of the shaft 51 thereby permitting the gear 52 to freely rotate with the shaft 51, as the rack 45 is moved transversely of the gear clamp 50 and longitudinally within the tubular members 44 and 47, note Figures 4 and 8. The back 29 may then be swung by the operator to a selected inclined position or to a horizontal sleeping position thereby causing the bars 34 to swing the rocking plates 39 of the rocking frame upon the shaft 37 and force the tubular member 44 forwardly. This movement will move the rack bar 45 forwardly into the tubular member 47 and through the casing of the gear clamp 50 which in turn will rotate the gear 52 which meshes with the rack. Since the gear 52 is fixed to the shaft 51 the head 58 will freely rotate between the loosened clamping jaws 54 and 55. Then by rotating the actuating rod 64 again in the opposite direction to that previously described, or clockwise, the adjusting threaded member or bolt 57 will draw the jaw 55 of a gear clamp 50 toward the jaw 54 thereof and into frictional clamping engagement with the head 58 to lock the shaft 51 in a set position and against further rotation until it again is released. The weight of the body of the occupant will hold the back 29 in a set position. When the back 29 is in an upright position, the back 29 may however be swung slightly forwardly to provide additional room and to permit a passenger to freely pass through the door of the automobile between the front and rear seats, since the tubular member 44 may slide rearwardly upon the rack bar 45 and the coil spring 49 will return the rocking frame and swing the back 29 of the front seat to its properly adjusted upright position.

When the back 29 is swung to a horizontal position, the arms 33 will be swung rearwardly by means of the links 69 from a substantially horizontal to an upright position shown in Figures 3 to 6 to support the rear portion of the front seat cushion 27 at the proper level for a comfortable bed position. The supports 72 will support the front portion of the back when in a horizontal position so as to maintain the upper faces of the front cushion 27, the back 29, and the rear seat cushion 26 in substantially the same horizontal plane.

When the back 29 is swung to the horizontal or bed position, the leg 78 shown in Figures 3 and 6 will be swung from a position parallel with the back 29 to a right angular supporting position with the lower end thereof in contact with the floor of the car to support the rear end of the back 29 in its bed position. When the back is raised the spring 82 folds the leg 78 shown to a position against the rear face of the back 29.

From the foregoing description, it will be seen that merely by unlocking the gear clamp 50, the back 29 may be swung to a selected position and then by locking the gear clamp the back 29 may be locked in the selected position, that is to say, either in a rearwardly inclined or a horizontal bed position, the back being manually swung by the operator to the selected position. Further it will be noted that one front seat may be adjusted to a selected position while the other front seat may remain in an upright or driving position so that one occupant of the car may rest in a reclining or prone position while the other occupant is driving the automobile. If desired, both of the front seats may be adjusted to a reclining or bed position since each front seat is similarly constructed requiring merely a duplicate structure.

Figure 14:
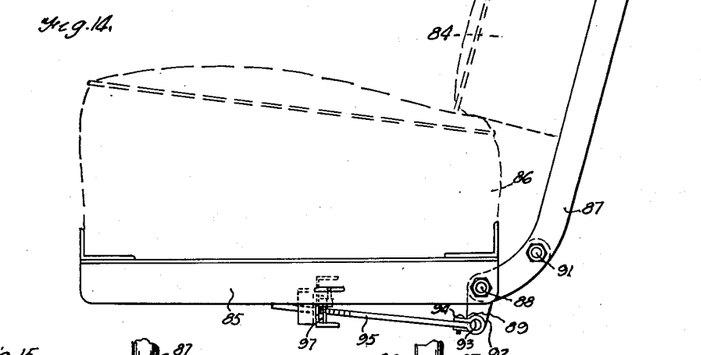
Figure 14 is a side elevational view of a modified form.
Figure 15:
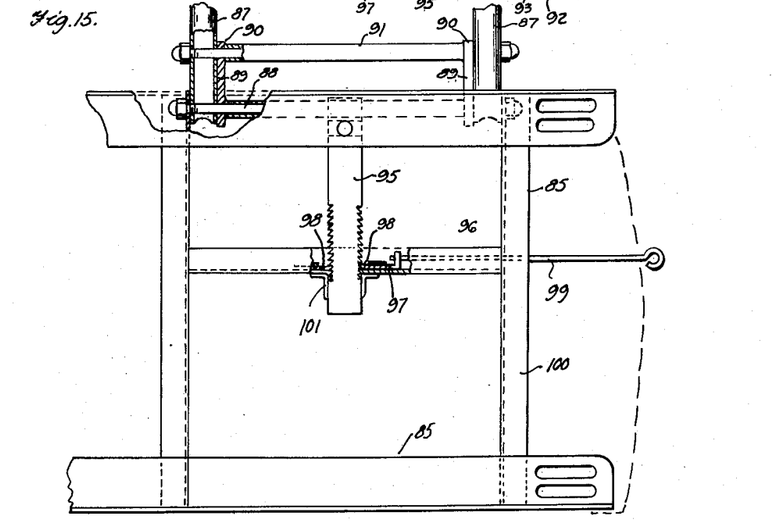
Figure 15 is a top plan view of the structure shown in Figure 13, certain parts being shown in section.
Figure 16:
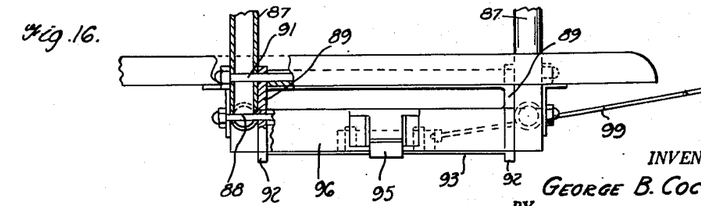
Figure 16 is a front view of the structure shown in Figures 14 and 15.

In Figures 14, 15 and 16 there is shown a modified form of the invention wherein a seat frame 85 supports the seat cushion 86. The back 84 of the seat is hingedly supported by a pair of bars 87 which are hinged on the transverse shaft 88 carried by the frame 85. Transversely spaced crank plates 89 are also hinged on the shaft 88 and each plate 89 is provided with a bracing arm 90 which is anchored to the adjacent bar 87 by means of the transverse bracing bar 91 which ties the bars 87 together near their inner ends, the bars 87 being secured to the back 84 in any desired manner. Each crank plate 89 is provided with a depending portion such as the depending portion 92 shown in Figure 14. A transverse bar 93 is carried between the lower ends of the depending portions 92 and supports a clamp 94 which carries a forwardly extending rack bar 95. The frame 85 supports a central brace 96 through which the forward end of the rack bar 95 extends. A transverse latching plate 97 is slidably mounted upon the brace 96 and is provided with a rack engaging tooth 98 for engaging the rack bar 95 to hold the rack bar 95 in a set adjusted position. The latching plate 97 is moved into and out of engagement with the teeth in the rack bar to lock or unlock the rack bar in an adjusted position. The teeth on one side of the rack bar 95 are arranged in staggered relation with respect to the teeth on the opposite side of the rack bar to facilitate graduated adjustment. An actuating rod 99 extends through one of the side rails 100 of the seat frame and is secured at its inner end to the latching plate 97. When the latching plate 97 is released from engagement with the rack bar 95, the operator may swing the back 84 to a selected position, thereby shifting the rack bar through the guide 101 of the transverse brace 96. When the back 84 is adjusted to the desired position, the latching plate 97 is shifted to a rack engaging position by manipulating the rod 99 to lock the rack bar 95 and back 84 in the selected adjusted position.

Figure 17:
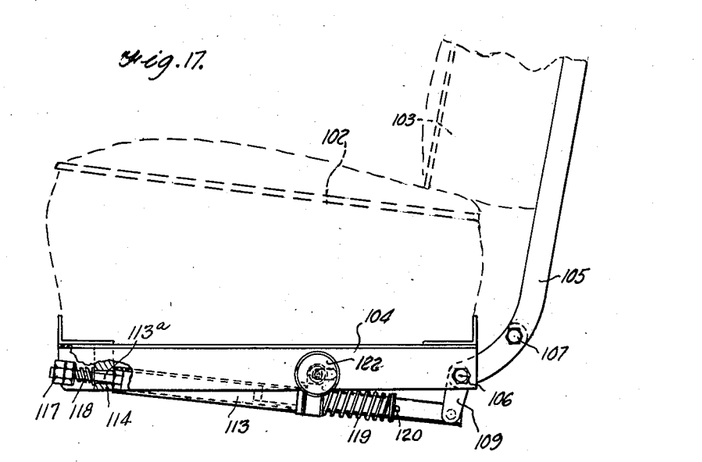
Figure 17 is a side elevational view of a further modified form of the invention.
Figures 18, 18A:
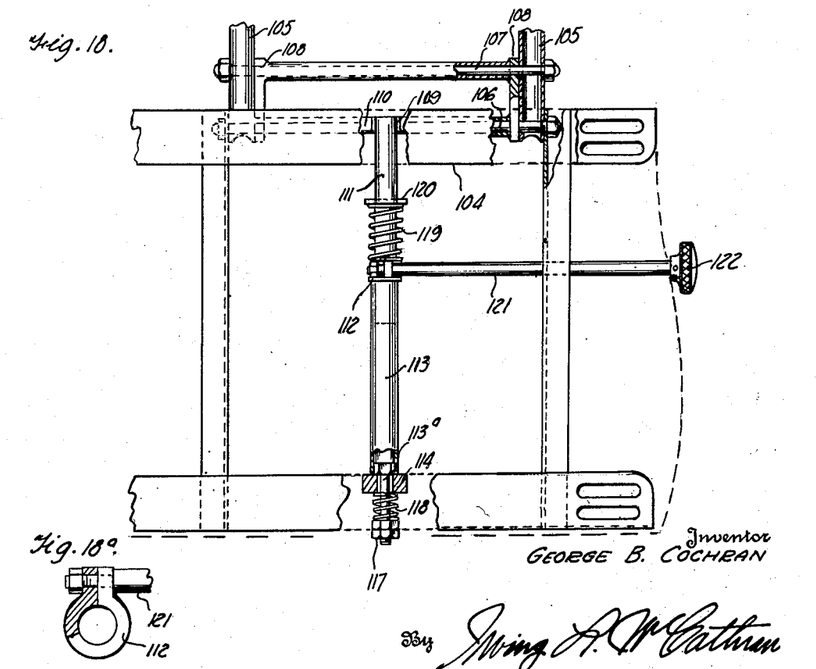

In Figures 17, 18, 19 and 20, there is shown a further modified form of my invention wherein 102 designates the seat cushion and 103 the hinged back. The seat cushion is mounted upon the frame 104 and the parallel back supporting bars 105 are hingedly secured to the rear of the frame 104 by means of a transverse supporting shaft 106. The bars 105 also are tied together by means of the transverse brace rod 107 as shown in Figure 18. Crank plates 108 are connected to the bars 105 and are journalled upon the supporting shaft 106. Each crank plate 108 is provided with a depending end 109 and the opposite crank plates 108 are tied together by the brace structure 110.

The back adjusting means comprises a piston tube 111 which is secured at one end to the brace structure 110 intermediate the ends thereof and the opposite end of the piston tube 111 is slidably secured through the clamp 112 and the anchoring tube 113. The tube 113 carries a forwardly extending tie bolt 113a which is fixed to the end of the tube 113, as shown in Figures 17 and 18, and passes through a guide 114 carried by the front of the frame 104. The forward end of the tie bolt 112a carries suitable nuts 117 shown. A coil spring 118 is carried by the bolt 113a and is interposed between the guide 114 and the nuts 117 to yieldably anchor the tube 113 to the front of the frame and at the same time permit the back 103 to be tilted forwardly to facilitate entrance of a passenger behind the front seat. This spring 118 will permit the tube 113 and piston tube 111 to move rearwardly under the pull of the crank plates 109 as the seat back 103 is swung forwardly. A coil spring 119 is interposed between the abutment 120 and the clamp to facilitate the sliding of the tube 111 through the tube 113 while swinging the back 103 relative to the seat 102. The clamp 120 is operated by an operating rod 121 which extends to the side of the seat 102 and is provided with a knob 122 at one end thereof.

Figure 19:
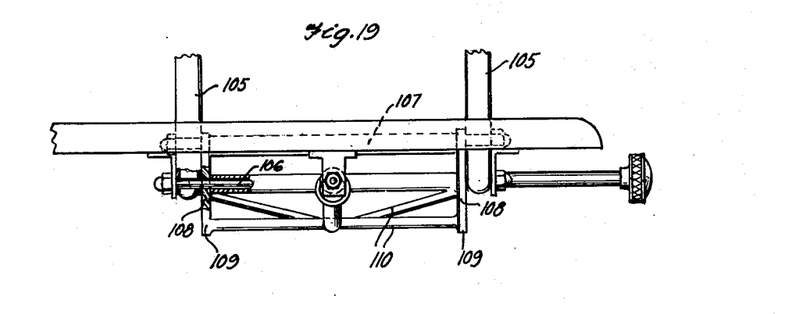
Figure 19 is a front elevational view of the structure shown in Figures 17 and 18, certain parts being shown in section.
Figure 20:
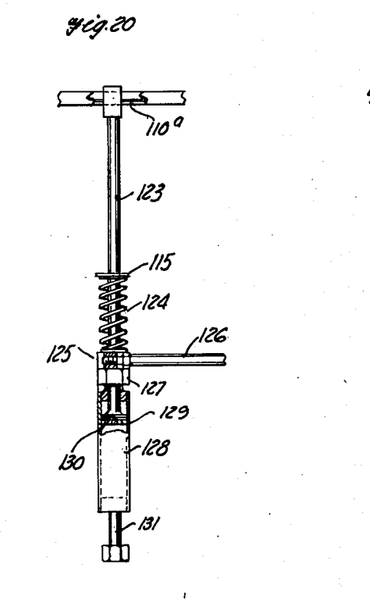
Figure 20 is a top plan view illustrating a hydraulic actuating mechanism which is adapted for use with the structure shown in Figure 18.

In Figure 20, I have shown a modified form of back adjusting means which may be used in place of the structure shown in Figures 17, 18 and 19. In this type of structure, the actuating rod 123 is secured to the brace structure 110a similar to the structure 110 shown in Figure 19. A coil spring 124 is carried by the actuating rod 123 intermediate an abutment 115 and the clamp 125 similar to the clamp 112 to permit forward swinging of the seat back in the same manner previously described. The clamp 125 is actuated by the rod 126 and this clamp 125 abuts the packing nut 127 carried by the cylinder 128 to limit forward movement of the rod 123 and to limit the backward swing of the back 103 to a set position. The rod 123 passes through the clamp 125 and the nut 127 and into the cylinder 128. A piston head 129 is carried within the cylinder 128 upon the end of the rod 123 as shown in Figure 20. The piston head 129 is provided with a bleeder orifice 130. The cylinder 128 contains a fluid which will check the movement of the piston 129 while passing through the orifice 130 thereby providing desired control when adjusting the seat back. Fluid may be inserted in the cylinder 128 through the tube 131.

Figure 21:
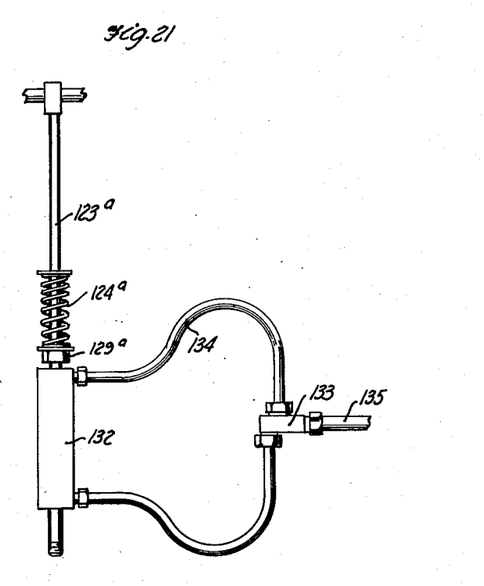
Figure 21 is a plan view of a further modified type of hydraulic actuating means.

In Figure 21 there is shown a modified form of the structure shown in Figure 20, where the rod 123a is similar to the rod 123 and carries a spring 124a similar to the spring 124. The rod 123a passes through a suitable packing nut 127a and into a standard hydraulic cylinder 132 of the conventional type in which a piston similar to the piston 129 is carried by the rod 123a. Rate of movement is accomplished by the use of a standard valve 133 in conjunction with the cylinder 132 to which connection is made through the hydraulic lines 134. A rod 135 actuates the standard valve 133.

Figure 11:
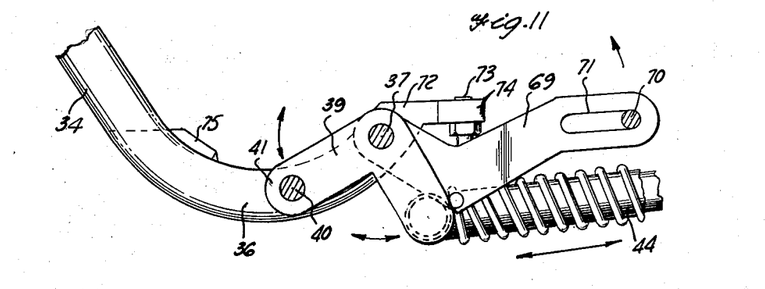
Figure 11 is a sectional view taken on line 11—11 of Figure 10.
Figures 12, 13, 22, 23, 24:
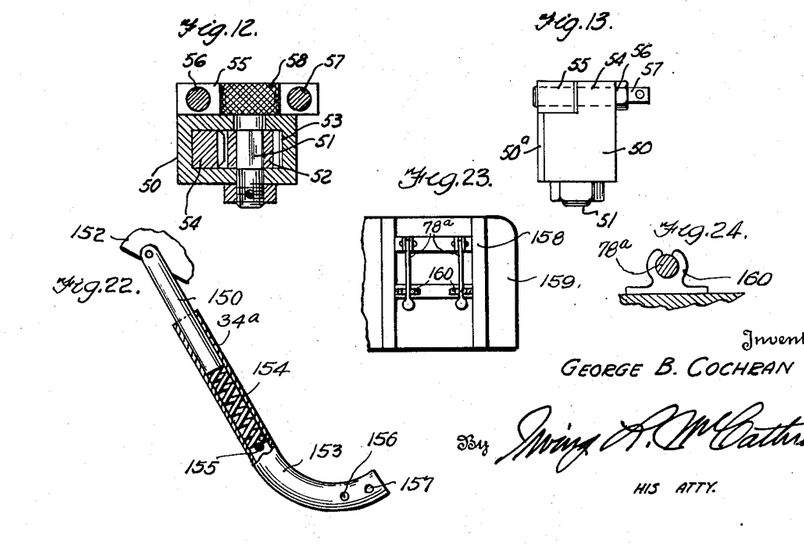
Figure 12 is a sectional view of the clamp taken on line 12—12 of Figure 8.
Figure 13 is a side elevational view of the clamp.
Figure 22 is a side elevational view, partly in section, of a modified form of seat back supporting bars.
Figure 23 is a rear elevational view of a modified form of seat back showing the supporting legs in a folded or inoperative position.
Figure 24 is an enlarged sectional view taken on line 24—24 of Figure 23.

In Figure 22 there is illustrated a modified form of a seat back supporting bar 34a which is provided with an extension portion 150 having an aperture 151 at its outer end for connection with the seat back 152. The extension portion 150 is slidably mounted in the tubular lower end 153 in which is mounted an expansion coil spring 154. The spring 154 is interposed between the inner end of the portion 150 and the stop pin 155 carried within the lower end 153 of the bar 34a. The type of bar 34a may be substituted for the bar 34 and may be connected to the rocker frame in the same manner as set forth with respect to the connection of the bars 34 illustrated in Figures 10 and 11, by connecting the rocker frame to the lower end of the bar 34a through the medium of the apertures 156 and 157.

In Figure 23 there is shown a modified form of seat back supporting means in the nature of a pair of hinged legs 78a which are hinged to the frame 158 of the seat back 159. The legs 78a are shown held in an inoperative position by means of the spring clamps 160. The legs are adapted to be manually swung outwardly to support the seat back in a bed position such as is shown in Figure 6 with respect to the legs 78.

Figure 25:
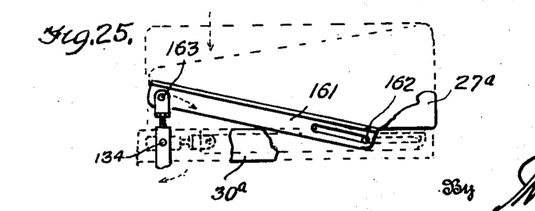
Figure 25 is a side elevational view of a modified form of seat cushion adjusting and supporting means.

In Figure 25 there is shown a modified form of seat cushion elevating means wherein the seat cushion 27a is carried by a rail 161, or slidably connected to a supporting frame 30a by means of a pin and slot connection 162 at the front end thereof. The rear end of the rail 161 is pivotally supported upon an adjustable lever 163 and this lever 163 is pivoted at 164 to the frame 30a. It should be noted that a plurality of rails 161 may be employed to support each front seat cushion.

Having described the invention, what is claimed as new is:

1. A seat of the class described comprising a seat section, a supporting frame supporting said seat section, a rocker frame rockably secured at the rear of said supporting frame, a back section secured to said rocker frame, a longitudinally adjustable member carried by said supporting frame and engaging said rocker frame and movable to an adjusted position when said back section is selectively moved to an inclined and a bed position, locking means engaging the adjusting means for locking the adjustable means in a selected position, said adjustable means comprising a connecting member secured to said rocker frame, a rack bar slidable relative to said connecting member, a gear meshing with said rack bar, said locking means comprising a clamp casing housing said gear, a shaft fixed to said gear and carried by said casing, means for locking said shaft in a set position to hold the gear and rocker frame and seat back in selected positions and against movement in one direction, and means facilitating movement of said seat back in the opposite direction.

2. A seat of the class described comprising a seat section, a back section, a seat supporting frame supporting the seat and back sections, a rocker frame rockably securing the back section relative to the seat section upon the seat supporting frame to facilitate the selected swinging of the back section to and from an inclined as well as a horizontal and also a substantially vertical position, a forwardly extending member secured to the rocker frame, a rack bar slidable relative to the forwardly extending member, means for limiting the sliding movement of the rack bar in one direction relative to said member, a gear meshing with said rack bar, a shaft fixed to the gear, and a clamp engaging the shaft to lock the shaft and rack bar in a set position to hold the rocker frame and seat back in a selected adjusted position.

3. A seat of the class described comprising a seat supporting frame, a seat section, and a back section carried thereby, a rocker frame rockably securing the back section relative to the seat section to facilitate the selected swinging of the back section to and from an inclined as well as a horizontal and also a substantially vertical position, a forwardly extending member secured to the rocker frame, a rack bar slidable relative to the forwardly extending member, means for limiting the sliding movement of the rack bar in one direction relative to said member, a gear meshing with said rack bar, a shaft fixed to the gear, a clamp anchored to the supporting frame engaging the shaft to lock said gear and rack bar against movement and to thereby lock the rocker frame and seat back in a selected adjusted position, and an actuating rod for operating said clamp.

4. A seat of the class described comprising a seat section, a supporting frame for said seat section, a back section, a pair of bars slidably engaging the back section and hingedly secured to said supporting frame, a rocker frame hinged to said supporting frame and to said bars for swinging in unison with the bars, said rocker frame comprising a pair of rocker plates secured to the bars, transverse members connecting the ends of the rocker plates together, and means projecting under said supporting frame and connected to said rocker frame for locking said rocker frame and back section in a selected position.

5. A seat of the class described comprising a seat section, a supporting frame for said seat section, a back section, a rocker frame hingedly supporting said back section upon said supporting frame relative to said seat section, a longitudinally extensible member fixed at one end to said supporting frame and engaging said rocker frame at its opposite end, the extensible means being movable to and from selected positions as the back section is swung relative to the seat section, locking means engaging the extensible member to lock the extensible member in a selected position and to thereby hold the back and seat sections in selected positions, the back section being movable selectively to an upright, an inclined, as well as a horizontal bed position, means carried by the supporting frame and actuated by said rocker frame and detachably engageable with said seat section for moving said seat section to a level position with said back section when the back section is swung to a horizontal bed position, back supporting arms carried by the rocker frame, retractible supporting legs for supporting the back rest in a horizontal bed position, and means actuated by said arms for moving said retractible legs to an extended operative position when said back rest is moved to a horizontal bed position.

GEORGE B. COCHRAN.

References Cited in the file of this patent

UNITED STATES PATENTS

| Number | Name | Date |
|---|---|---|
| 1,241,420 | Murray | Sept. 25, 1917 |
| 1,255,563 | Ostendorf | Feb. 5, 1918 |
| 1,773,597 | Myerson | Aug. 19, 1930 |
| 1,797,829 | Hultgren | Mar. 24, 1931 |
| 1,898,912 | Turk | Feb. 21, 1933 |
| 1,924,329 | Pasternick et al. | Aug. 29, 1933 |
| 2,018,828 | Bell | Oct. 29, 1935 |
| 2,162,060 | Churchill | June 13, 1939 |
| 2,258,119 | Mathé et al. | Oct. 7, 1941 |
| 2,270,172 | Ruegger | Jan. 13, 1942 |
| 2,540,947 | Hughes | Feb. 6, 1951 |

FOREIGN PATENTS

| Number | Country | Date |
|---|---|---|
| 268,840 | Germany | Jan. 6, 1914 |